Nov. 2, 1965        H. D. CHAMBERS        3,215,384
YIELDING CONNECTION FOR ANCHORING A RIGID ARM TO A VEHICLE FRAME

Original Filed March 22, 1962        3 Sheets-Sheet 1

INVENTOR
Harry Donald Chambers
BY Wenderoth,
Lind and Ponack
ATTORNEYS

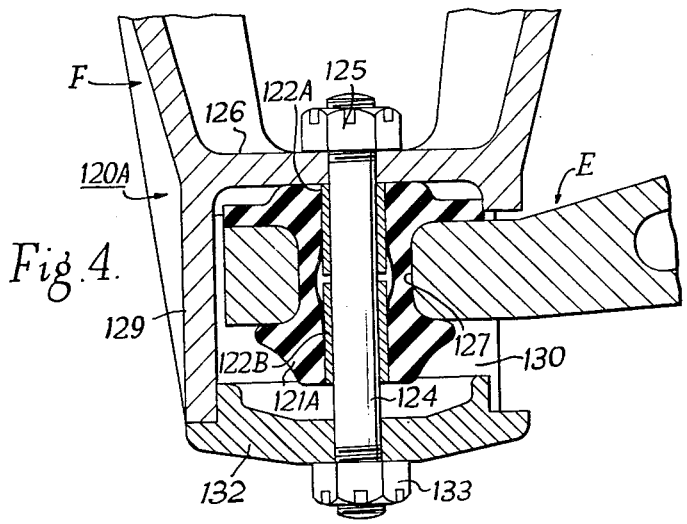
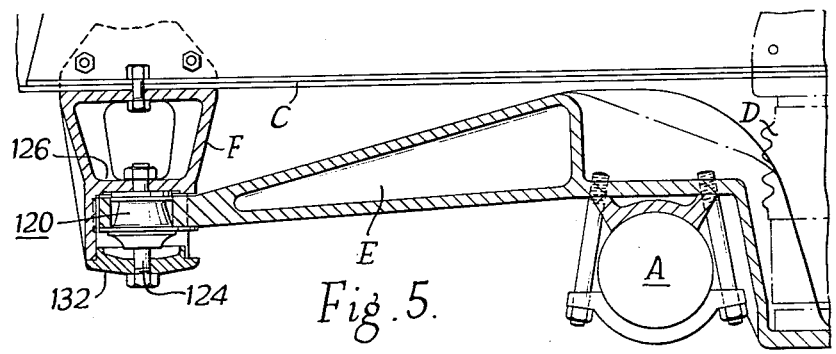
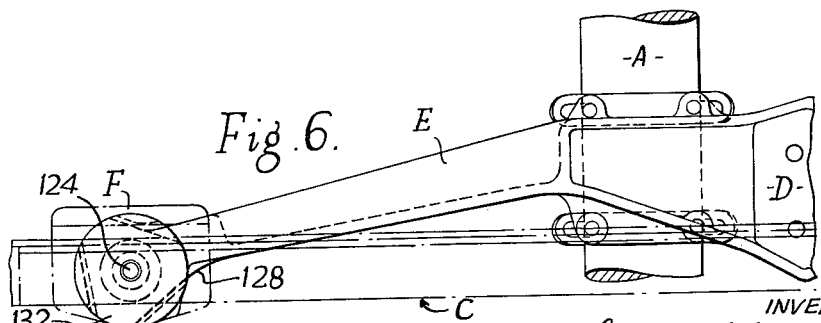

United States Patent Office 3,215,384
Patented Nov. 2, 1965

3,215,384
YIELDING CONNECTION FOR ANCHORING A RIGID ARM TO A VEHICLE FRAME
Harry Donald Chambers, Cuddington, near Northwich, England, assignor to Eaton Axles Limited, Warrington, England, a British company
Original application Mar. 22, 1962, Ser. No. 181,670. Divided and this application Dec. 12, 1963, Ser. No. 330,110
Claims priority, application Great Britain, Mar. 27, 1961, 11,192/61
3 Claims. (Cl. 248—204)

This invention relates to suspension systems for vehicles, the present application being a division of my copending patent application Serial No. 181,670, filed March 22, 1962.

The main object of this invention is to provide novel forms of single axle and tandem axle suspension systems for vehicles; in the case of a tandem axle suspension system the two axles are mounted at opposite ends of a rocker.

Another object of the invention is to provide novel forms of suspension systems incorporating, for each side of an axle assembly, a rigid beam attachable elastically to the frame of a vehicle connected to said axle assembly in such manner that it may tilt in relation to the sprung mass, the connection to said sprung mass being through a yieldable device, particularly cylinder unit means having a cylinder within which moves a ram which includes an elastic part to permit the lower end of the ram to tilt in relation to the head end of the ram.

On a road vehicle suspension controlled by trailing or leading radius arms, a controlled degree of freedom in three planes is necessary to prevent high stresses being produced in the vehicle frame or in the axle assembly when tilting of the latter occurs in relation to the vehicle frame. The fact that without this freedom, considerable forces are transmitted between the axle assembly and the frame, means that a harsh "ride" occurs on independent wheel movements regardless of the effective deflection values of the suspension springs employed.

Where frame design has permitted, control arms have been used which have been formed so as to produce a triangular structure with the axle as the base, a ball or equivalent type of joint being used to attach the apex of the triangle to the frame.

When other considerations prevent such a construction being used, the control arms have been connected to frame members at each side of the vehicle by means of shackle brackets, and the associated trailing or leading radius arms have been made resilient torsionally and in the vertical plane (for example, the arm has sometimes taken the form of a leaf spring of quarter elliptic form).

As the control arm is usually required to carry braking or driving forces it has necessarily been designed stiff enough to carry the resulting torque reaction without excessive deflection. Although this requirement can be satisfactorily met, without loss of freedom in three planes, in a suspension system where the sprung load is subject to comparatively small changes (as, for example, on the front axle of a commercial vehicle), no resiliently attached control arm of simple construction and capable of meeting all requirements when large changes of sprung loading occur has hitherto been provided.

It is therefore a further object of this invention to provide a novel vehicle suspension system incorporating an improved form of control arm adapted to meet these often conflicting requirements, and one capable of simple application to existing vehicle frame members; such improved control arm is primarily intended for use in a suspension system where the rate is varied automatically with the load being carried, for example, in systems using air or hydropneumatic spring devices.

More particularly it is an object of the invention to provide such novel suspension system which uses a control arm of rigid or comparatively rigid form and providing limited, virtually free movement at the point of attachment to the vehicle frame.

The aim of using such a control arm is to ensure that, during normal travel, the attachment is more or less "floating," but that when driving or braking torque is applied to the axle assembly the control arm is brought against suitable stops and is held there with a force proportional to the degree of torque on the axle, which is, in turn, related to the sprung load on the suspension. Thus whilst increased forces are transmitted to the frame these forces are not such as to produce harsh riding conditions.

Examples of such "free movement" attachment means will hereinafter be described as applied to a single front axle and also to a single rear axle, but it will be understood that the form of an installation will be largely influenced by the space available and the required riding characteristics.

In order that the invention may be more readily understood, reference will now be made to the accompanying drawings which illustrate, by way of example, yieldable connection means for rigid arms incorporated in suspension systems, in accordance with the invention.

In the drawings:

FIGURE 4 is a view similar to FIGURE 3, showing an alternative form of anchorage; and FIGURES 5 and 6 are views, similar to FIGURES 1 and 2 respectively, of a suspension system for a rear axle.

Figure 1:
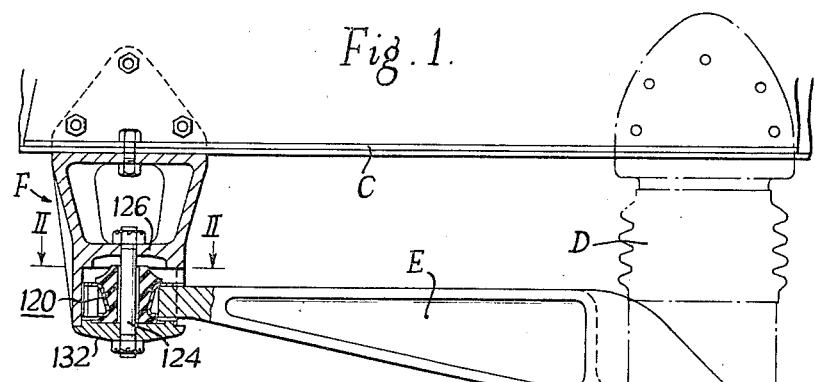
FIGURE 1 is a part-sectional side view of a suspension system employing a rigid beam in the form of a control arm fixedly secured at one end to a front axle, (whereat a cylinder unit is located) and articulatingly attached at the other end to an anchorage on the vehicle frame.
Figure 2:
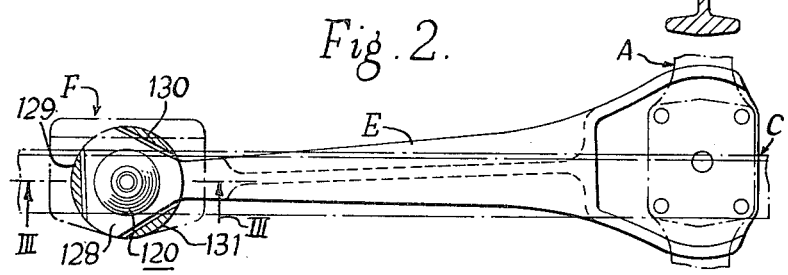
FIGURE 2 is a sectional plan on line II—II of FIG. 1.
Figure 3:
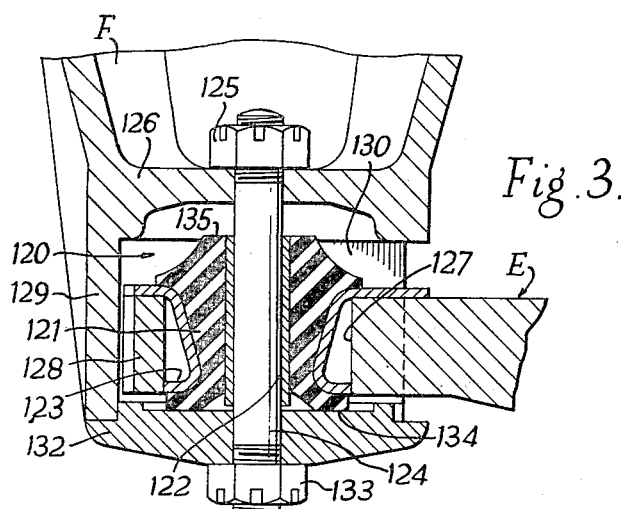
FIGURE 3 is an enlarged vertical sectional view on line III—III of FIGURE 2.
Figure 7:
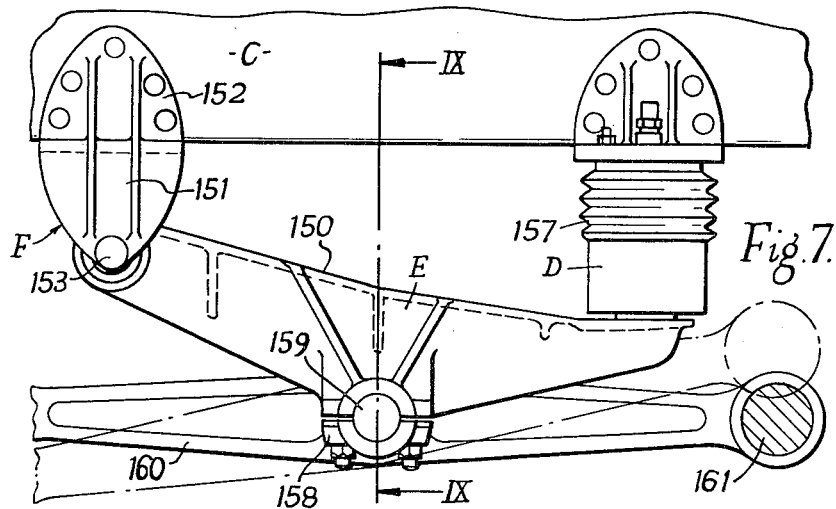
Figure 8:
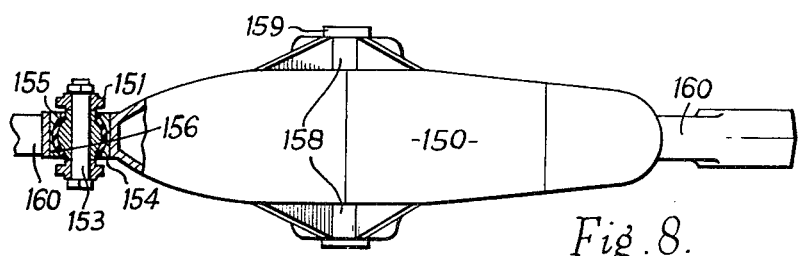
Figure 9:
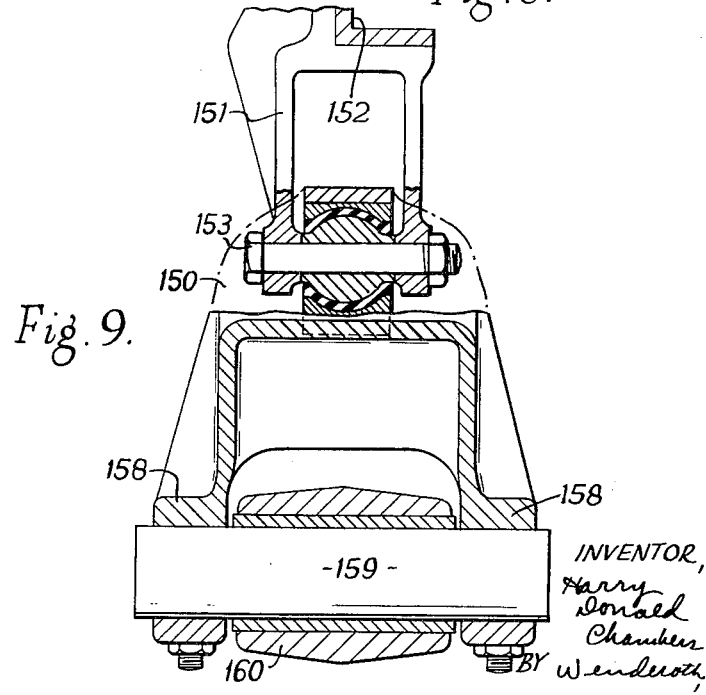

In the embodiment illustrated in FIGURES 1, 2 and 3 the means for attaching the control arm E to a hanger bracket F comprises an elastic connection 120 consisting of a bush 121 of rubbery material bonded to or assembled with an inner straight rigid metal sleeve 122 and to a tapering outer rigid metal sleeve 123 respectively. The sleeved bush 121 is slidable vertically upon a bolt 124 suspended by nut 125 from a horizontal plate 126 forming part of the hanger bracket F. The sleeved bush 121 is pressed into a through bore 127 in the end 128 of control rod E, the rod end 128 being accommodated within a housing formed beneath plate 126 by a back wall 129, two side lugs 130, 131 and a cap 132 clamped by a nut 133 on bolt 124.

The attachment means may be of substantially the same form for both front and rear axles, the elastic connection 120 in the rear axle version (FIGURES 5 and 6) being reversed end-to-end as compared with the front axle version (FIGURES 1 and 2).

Another difference is that for a rear axle, where the cylinder unit D is situated, beyond the axle A, the control arm E is conveniently of asymmetrical shape in plan, whereas for a front axle, where the cylinder unit is located above the axle A, the control arm E may be symmetrical; the symmetrical or asymmetrical shape of the control arm E determines to some extent the shape of side lugs 130, 131. Where the axle assembly A is arranged between the cylinder unit D and the anchorage for control arm E, the load is divided between the cylinder unit and the anchorage.

The depth of the housing for the end 128 of the control rod E is such as to permit first of free vertical travel of the elastic connection 120 over bolt 124, which is followed by further movement governed by the endwise yielding of the bush 121, until finally the sleeves 122, 123 make metal-to-metal contact with bracket plate 126 on cap 132. Forces tending to produce lengthwise movement of axle A relatively to vehicle frame C are shared between the resiliency of the elastic connection 120 and the resiliency of cylinder unit D. In positions of predetermined radial displacement of control arm E its end 128 engages one or other of lugs 130, 131 which then carry the residual force. The elastic connection 120 is also adapted for torsional deformation by movement of axle A toward the frame C, and on rebound movements exceeding its free travel.

When the vehicle "rolls" or when one wheel is displaced vertically, torsional displacement and vertical movement of the appropriate nearside or offside elastic connection occurs.

Suspension loads are carried by the snubbng action of the flange 134 or the nose 135 in contacting the opposing bracket plate 126 and driving or braking torque reactions are met by engagement of bush 121 with either plate 126 or cap 132. When the load on the control arm E exceeds the rated loading of the bush 121 the arm end 128 makes metal-to-metal contact with the underface 136 of plate 126 or with cap 132.

FIGURE 4 shows a modified form of resilient connection 120A between control arm E and bracket F. In this case the outer sleeve 123 is omitted and the bush 121A makes direct contact with the bore 127 of control arm E. The inner sleeve is preferably made, as shown, in the form of aligned sleeves 122A, 122B, which may be bonded to the bore of bush 121A, a midportion of said bush being of thinner wall form and constrained to maintain close contact with arm bore 127.

Depending on the riding characteristics to be obtained, the axle A may be nearer to or more distant from the pivot axis of the link E than its associated hydraulic cylinder unit D, that is, in one or other of the positions indicated in FIGURE 1 and FIGURE 5. In either arrangement the axis of the cylinder unit D is arranged so that the deflection of the base end of its piston or ram in relation to said axis is held to a minimum as the link E swings between its limits of movement along an arcuate path.

The suspension system illustrated in FIGURES 1 and 2 may be applied also to the front axle of a vehicle, where structural conditions permit, and when this arrangement is thus used, or the system illustrated in FIGURES 5 and 6 is employed, the single cylinder units employed on opposite sides of the vehicle may be placed in open communication with each other, and with cylinder units which provide resilience for the rear axle (or axles) of the vehicle.

Although improved control arms have been illustrated as applied to single axles it will be understood that such arms may be used with tandem axles, and that whether applied to single or tandem axles the main vehicle springing means (that is, the cylinder units) are not necessarily of the constructions hereinbefore described.

The cylinder unit D employed in any of the suspension systems above described is preferably one which operates in accordance with the principles of the co-pending patent application Serial No. 795,258, filed February 24, 1959, now Patent 3,049,362, that is to say, one in which hydraulic fluid is supplied continuously to the cylinder unit and released therefrom whenever the ram of the cylinder unit exceeds a predetermined height in its cylinder. This end is achieved in the construction of cylinder unit specifically described in said copending application by providing a fluid inlet in the hollow pin by which the unit is suspended, and an outlet port in the wall of the cylinder, said outlet port being conveniently made of greater width than its height, that is, of elliptical or of rectangular shape, with the longer dimension horizontal. Relative movement of the ram and cylinder causes partial or complete closure of the outlet port to regulate release of hydraulic fluid from the cylinder unit. The same control principle is employed in alternative forms of cylinder units described in the aforesaid copending patent application Serial No. 181,670.

I claim:

1. An anchorage for a rigid arm attachable to an axle assembly, said anchorage providing for virtually free, limited movement about and along an axis of pivoting and comprising a rigid arm having an opening in at least its anchoring end, a hanger bracket adapted for firm attachment to a vehicle frame, said bracket having vertically and laterally spaced abutment surfaces providing an open-side gap having vertically spaced surfaces for the reception therebetween of the anchoring end of said arm, a pivot extending vertically through said open-side gap, and an elastic bushing comprising a rubbery sleeve accommodated within said opening in said anchoring end of said arm and slidably embracing said pivot, the overall height of said elastic bushing being less than the distance between said vertically spaced surfaces within said gap and the lateral width of the open side of said gap being greater than the width of said anchoring end of said arm to permit of limited vertical displacement of said bushing along said pivot and also limited side swing and torsion of said bushing relatively to said pivot.

2. An anchorage as claimed in claim 1, having inner and outer rigid metal sleeves between which said rubbery sleeve is interposed and to which said sleeve is bonded, said inner sleeve slidably receiving said pivot and said outer sleeve being snugly received within said opening in said anchoring end of the arm.

3. An anchorage as claimed in claim 1, in which said rubbery sleeve is received directly within said opening in said anchoring end of said arm, the free shape of said rubbery sleeve being such that when confined within said opening it biases its outer surface to maintain contact with the opening.

References Cited by the Examiner

UNITED STATES PATENTS

| | | | |
|---|---|---|---|
| 2,061,985 | 11/36 | Saurer | 267—67 |
| 2,713,498 | 7/55 | Brown | 280—124 X |
| 2,808,270 | 10/57 | Muller | 180—73 X |
| 2,841,230 | 7/58 | Neuschaefer | 180—73 |
| 2,843,214 | 7/58 | Muller | 180—73 |
| 3,069,185 | 12/62 | Holmstrom | 280—124 |

FOREIGN PATENTS

| | | |
|---|---|---|
| 529,948 | 12/40 | Great Britain. |
| 604,782 | 9/60 | Canada. |

BENJAMIN HERSH, *Primary Examiner.*

LEO FRIAGLIA, A. HARRY LEVY, *Examiners.*